(12) United States Patent
Burry et al.

(10) Patent No.: US 7,850,407 B2
(45) Date of Patent: Dec. 14, 2010

(54) MOTORCYCLE TRANSPORT DEVICE

(75) Inventors: James M. Burry, Troutman, NC (US); Daniel R. Seymour, Mooresville, NC (US)

(73) Assignee: BISS Product Development LLC, Mooresville, NC (US)

( * ) Notice: Subject to any disclaimer, the term of this patent is extended or adjusted under 35 U.S.C. 154(b) by 480 days.

(21) Appl. No.: 12/029,486

(22) Filed: Feb. 12, 2008

(65) Prior Publication Data

US 2008/0199271 A1 Aug. 21, 2008

Related U.S. Application Data

(60) Provisional application No. 60/889,945, filed on Feb. 15, 2007.

(51) Int. Cl.
*B60P 7/08* (2006.01)
(52) U.S. Cl. .................................. 410/3; 410/7; 410/9
(58) Field of Classification Search ................ 410/3, 410/7, 9, 22, 80; 211/20, 22; 224/501, 510, 224/536, 552, 42.38, 554, 570, 924; 248/503
See application file for complete search history.

(56) References Cited

U.S. PATENT DOCUMENTS

| 4,887,754 | A | 12/1989 | Boyer et al. |
| 5,846,047 | A | 12/1998 | Riekki |
| 6,802,493 | B2 | 10/2004 | Lance |
| 6,805,522 | B2 * | 10/2004 | Condon .................. 410/3 |
| 2006/0171790 | A1 | 8/2006 | Macomber, III |

* cited by examiner

*Primary Examiner*—Stephen Gordon
(74) *Attorney, Agent, or Firm*—Hammer & Associates, P.C.

(57) ABSTRACT

A motorcycle transport device comprising a base, a pair of first upright members attached to the base, and a pair of second members telescopically connected to the first upright members. A lower jaw is attached to each of the first upright members and an upper jaw is attached to each of the second members. A lock assembly is operatively associated with the first upright member and the second member. The lock assembly is adapted to hold the lower jaw and the upper jaw in a closed position.

20 Claims, 8 Drawing Sheets

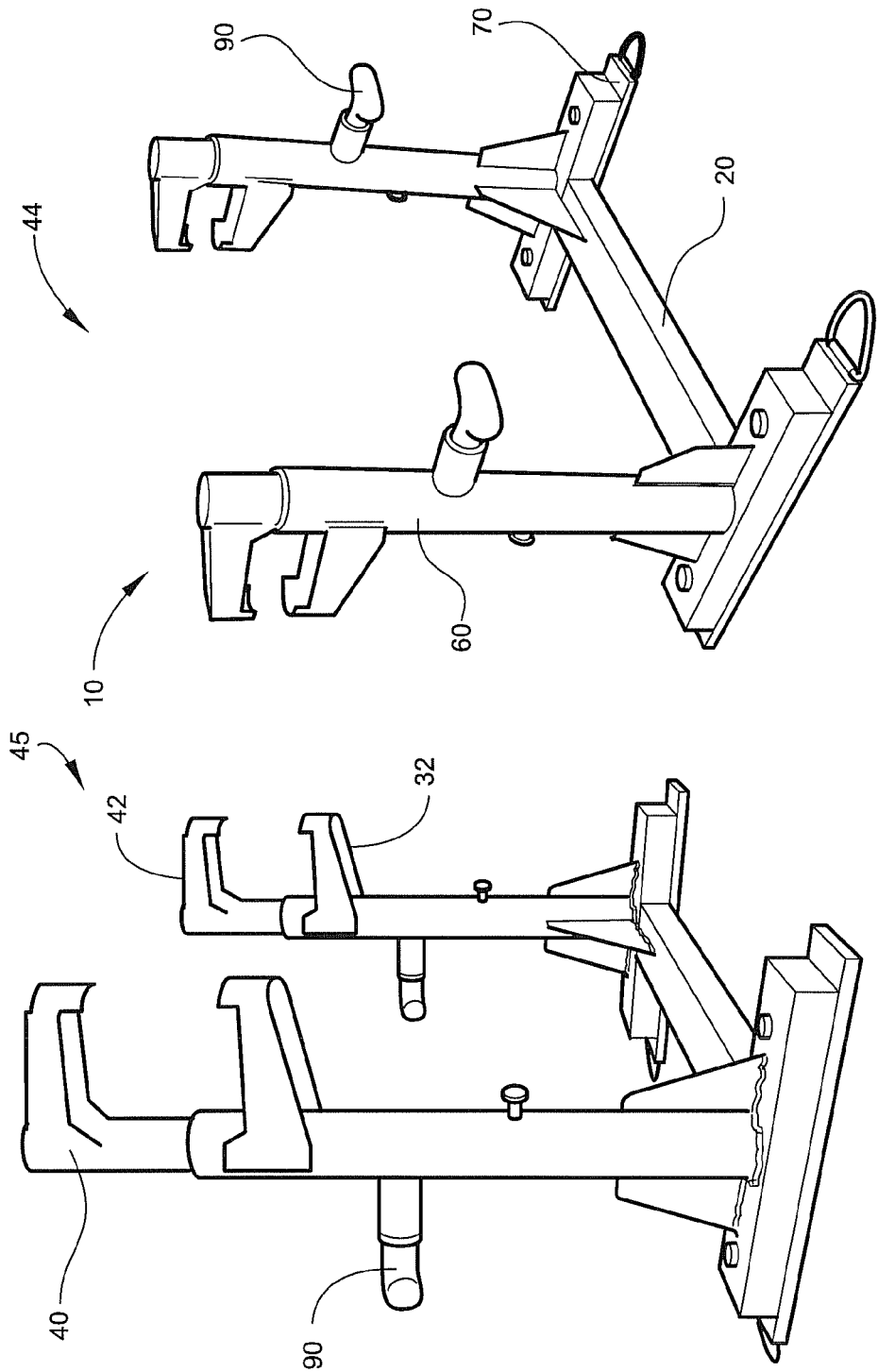

MOTORCYCLE TRANSPORT DEVICE

RELATED APPLICATIONS

This application claims the benefit of provisional application Ser. No. 60/889,945 filed Feb. 15, 2007.

FIELD OF THE INVENTION

The instant application relates to a transport device for motorcycles and a method of using the same.

BACKGROUND OF THE INVENTION

The typical two wheel design of motorcycles creates unique obstacles when a person wishes to transport a motorcycle without driving it. Motorcycles have a high center of gravity and suffer from lateral instability. It is necessary to secure a motorcycle in a balanced, upright position in order to transport the motorcycle without inflicting any damage.

The most common methods of securing motorcycles for transport in the past begin with loading the motorcycle onto a trailer, onto the bed of a pickup truck, or into a moving van. Transporters then utilize rope, chains, tie-down straps, or wheel chocks, either separately or in combination, to provide the necessary lateral support to secure the motorcycle in an upright position. However, the use of tie-down straps and wheel chocks is awkward, cumbersome, time consuming, and difficult for an individual to accomplish alone.

Hence, there is a need for a motorcycle transport device which rapidly and easily secures a motorcycle for transport, and releases the motorcycle with the same ease and rapidity.

SUMMARY OF THE INVENTION

A motorcycle transport device comprising a base, a pair of first upright members attached to the base, and a pair of second members telescopically connected to the first upright members. A lower jaw is attached to each of the first upright members and an upper jaw is attached to each of the second members. A lock assembly is operatively associated with the first upright member and the second member. The lock assembly is adapted to hold the lower jaw and the upper jaw in a closed position.

BRIEF DESCRIPTION OF THE DRAWINGS

For the purpose of illustrating the invention, there is shown in the figures a form that is presently preferred; it being understood, however, that this invention is not limited to the precise arrangements and instrumentalities shown.

DETAILED DESCRIPTION

Figure 1:
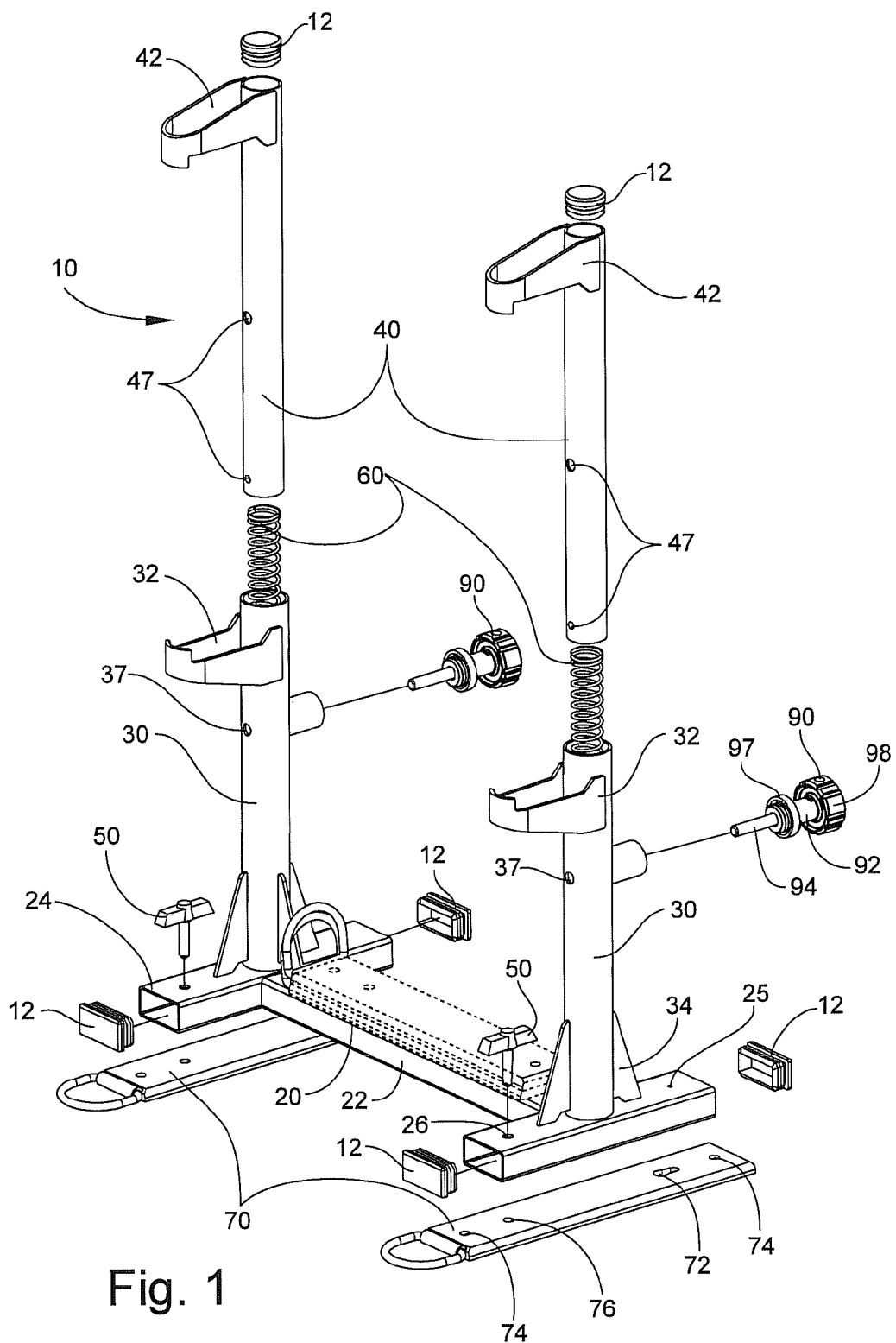
FIG. 1 illustrates an exploded perspective view of a motorcycle transport device.

Referring to the drawings, where like numerals indicate like elements, there is shown in FIGS. 1, 6a, and 6b an embodiment of a motorcycle transport device 10. The motorcycle transport device 10 may be used to securely transport a motorcycle, an ATV, or similar motorized or non-motorized vehicle.

A motorcycle transport device 10 may be comprised of basic components such as a base 20, a pair of first upright members 30, a pair of second members 40, and a lock assembly 90.

A base 20 provides a stable platform on which the remainder of the motorcycle transport device is constructed. The base 20 may include a crossbar 22 and two endbars 24. The crossbar 22 attaches one of its ends to a side of the first of two endbars 24. The crossbar 22 then attaches its opposite end to the side of the second of two endbars 24. The crossbar 22 may be attached anywhere along the length of the side of each endbar 24. The crossbar 22 may be comprised of any materials durable enough to remain functionally intact after numerous uses as a motorcycle transport device 10. Suitable crossbar 22 materials include, but are not limited to, metal, plastic, wood, or combinations thereof. The crossbar 22 may have a shape selected from the group consisting of rectangle, square, circle, semicircle, triangle, oblong, oval, tetrahedral, trapezoid, diamond, or combinations thereof. The crossbar 22 will preferably possess a flat surface facing away from the ground in order to more easily facilitate vehicles driving over it as they are secured within the motorcycle transport device 10.

An endbar 24 may be comprised of any materials durable enough to remain functionally intact after numerous uses as a motorcycle transport device 10. Suitable crossbar 22 materials include, but are not limited to, metal, plastic, wood, or combinations thereof. The endbar 24 may have a shape selected from the group consisting of rectangle, square, circle, semicircle, triangle, oblong, oval, tetrahedral, trapezoid, diamond, or combinations thereof. In one embodiment of the present invention, an endbar 24 may have an opening 29 that is defined by a bushing 26. A fastener 50 may pass through the bushing 26 in order to secure the endbar to a surface or device. In another embodiment, an endbar 24 may have an opening 29 which passes through the endbar 24. A fastener 50 may pass through the opening 29 in order to secure the endbar to a surface or device. In another embodiment, an endbar 24 may have a lock down pin 25 emanating from its surface. In yet another embodiment, an endbar 24 may have an upper surface 27 and a lower surface 28. One or more lock down pins 25 may emanate from the lower surface 28 of the endbar 24 and used to secure the endbar to a surface or device. In still another embodiment, end caps 12 may be used to cover and/or seal the ends of the endbar 24.

Figure 2:
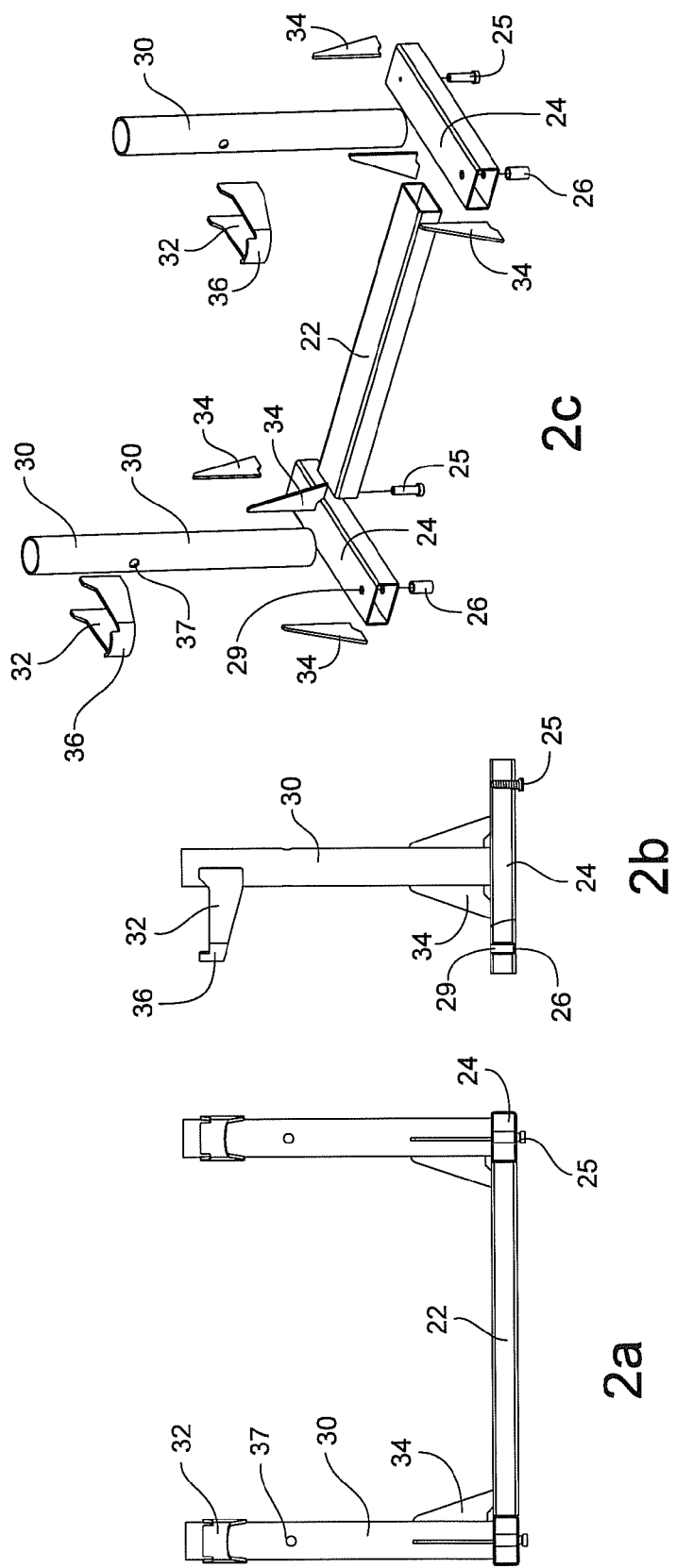
FIG. 2 illustrates a front view (2a), a side view (2b), and a perspective view (2c) of a base and upright members of a motorcycle transport device.

First upright member 30 is attached to a base 20. In one embodiment, a first upright member 30 is attached at a substantially perpendicular angle to a base 20. Referring to FIGS. 1 and 2, there is illustrated an embodiment of a first upright member 30 having a substantially cylindrical shape. A first upright member 30 may be comprised of any materials durable enough to remain functionally intact after numerous uses as a motorcycle transport device 10. Suitable first upright member 30 materials include, but are not limited to, metal, plastic, wood, or combinations thereof. A first upright member 30 may have a shape selected from the group consisting of rectangle, square, circle, semicircle, triangle, oblong, oval, tetrahedral, trapezoid, diamond, or combinations thereof. In the embodiment depicted in FIG. 1, three supports 34 attach to each first upright member 30 and to a base 20. In another embodiment, one or more supports 34 may be used to help secure, attach, and/or stabilize a first upright member 30 attached to a base 20. In still another embodiment, two supports 34 may attach to each first upright member, and also attach to each end bar 24. In still another embodiment, one support 34 may attach to each first upright member, and also attach to a crossbar 22. Referring now to FIGS. 1, 2a and 2c, there is illustrated an opening 37 through the first upright member 30. In another embodiment, there may be two or more openings 37 through the first upright member 30.

A lower jaw 32 may be attached to each first upright member 30. Referring to FIGS. 1, 2a and 2b, an embodiment of a lower jaw 32 is illustrated as being attached to a first upright member 30. The lower jaw 32 illustrated in FIGS. 1 and 2 is preferred, however a lower jaw may be embodied in any shape which retains its functionality to secure a motorcycle. FIGS. 1 and 2 also illustrate an embodiment of a lower jaw 32 wherein a lower jaw tooth 36 is depicted. In another embodiment of the present invention, a lower jaw 32 may have a plurality of lower jaw teeth 36. In yet another embodiment, the lower jaw teeth 36 may emanate in a direction substantially facing the upper jaw teeth 46. In still another embodiment, a lower jaw 32 may have no teeth.

Figure 3:
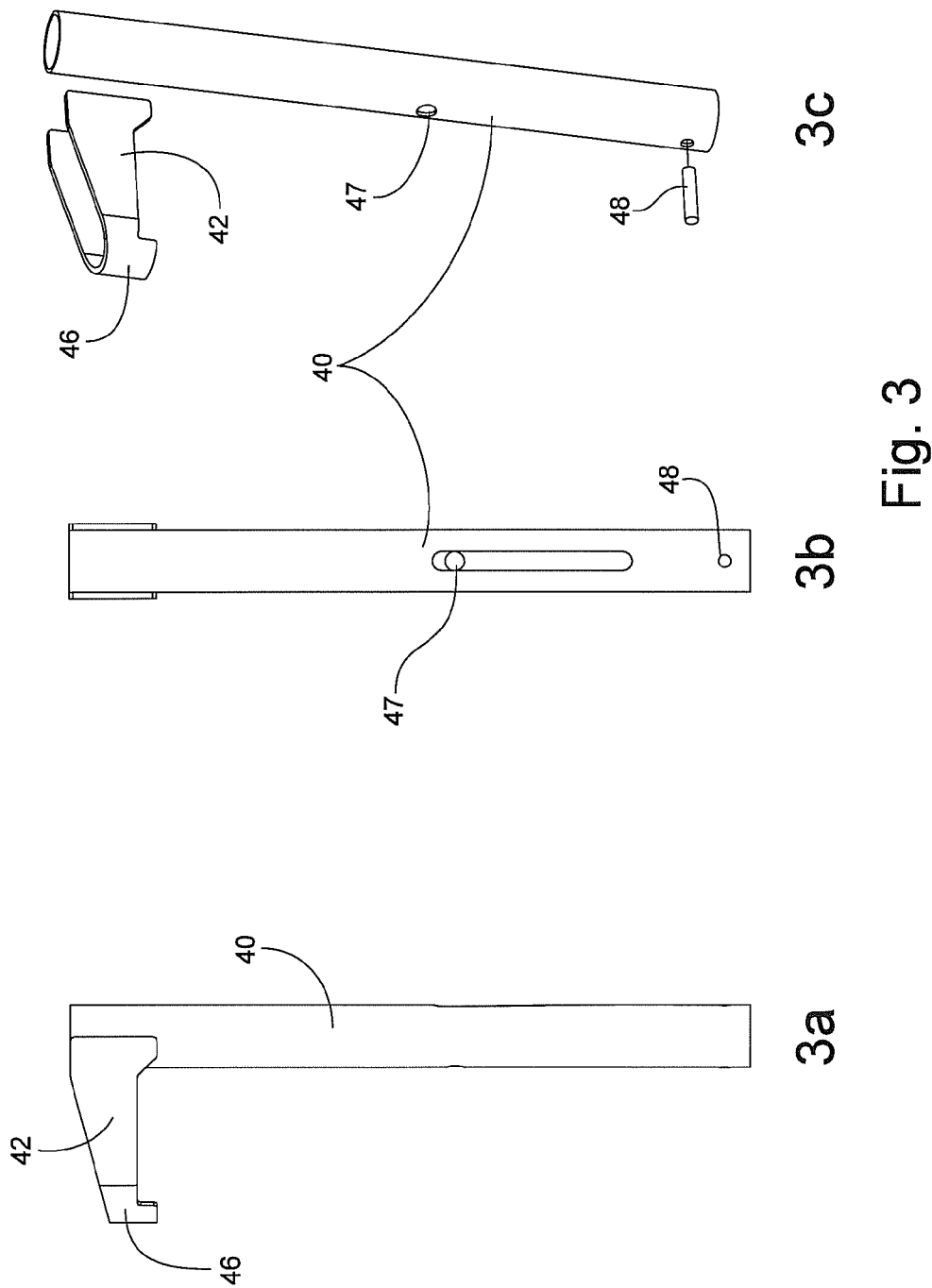
FIG. 3 illustrates a side view (3a), a front view (3b), and a perspective view (3c) of a second member of a motorcycle transport device.

A second member 40 may be telescopically connected to a first upright member 30. The first upright member 30 and the second member 40 work in combination to secure a motorcycle 80 for transport. Referring to FIGS. 1 and 3, there is illustrated an embodiment of a second member 40 having a substantially cylindrical shape. A second member 40 may be comprised of any materials durable enough to remain functionally intact after numerous uses as a motorcycle transport device 10. Suitable second member 40 materials include, but are not limited to, metal, plastic, wood, or combinations thereof. The second member 40 may have a shape selected from the group consisting of rectangle, square, circle, semicircle, triangle, oblong, oval, tetrahedral, trapezoid, diamond, or combinations thereof. In one embodiment of the present invention, end caps 12 may be used to cover and/or seal the ends of the second member 40. Referring again to FIGS. 1, 3b and 3c, there is illustrated an opening 47 through the second member 40. In another embodiment, there may be two or more openings 47 through the second member 40. Also illustrated in FIGS. 3b and 3c is a peg 48 which may be secured within an opening 47 through the second member 40. In use, the peg 48 may engage an upright spring 60 when a second member 40 is telescopically connected to a first upright member 30.

An upper jaw 42 may be attached to each second member 40. Referring again to FIGS. 1 and 3a, an embodiment of an upper jaw 42 is illustrated as being attached to a second member 40. The upper jaw 42 illustrated in FIGS. 1 and 3 is preferred, however a lower jaw may be embodied in any shape which retains its functionality to secure a motorcycle. FIGS. 1, 3a, and 3c also illustrate an embodiment of an upper jaw 42 wherein an upper jaw tooth 46 is depicted. In another embodiment of the present invention, an upper jaw 42 may have a plurality of upper jaw teeth 46. In yet another embodiment, the upper jaw teeth 46 may emanate in a direction substantially facing the lower jaw teeth 36. In still another embodiment, an upper jaw 42 may have no teeth.

Figure 5:
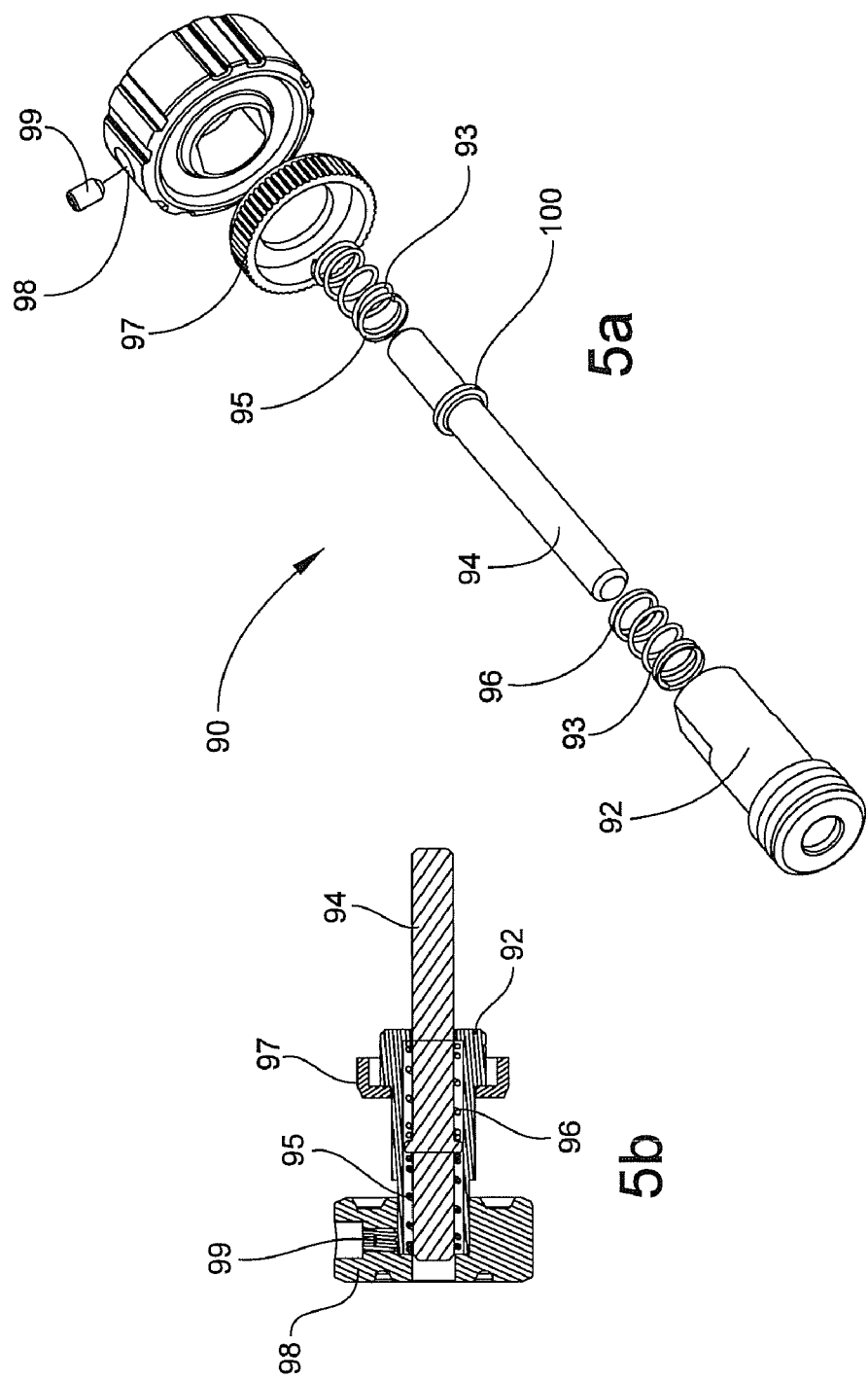
FIG. 5 illustrates an exploded perspective view (5a) and a cross section view (5b) of a lock assembly for a motorcycle transport device.

A lock assembly 90 refers to a device which may be operatively associated with a first upright member 30 and a second upright member 40 (See FIGS. 1 and 6). A lock assembly 90 may be adapted to hold a lower jaw 32 and an upper jaw 42 in a closed position. In one embodiment, a lock assembly 90 may be spring loaded. Referring to FIG. 5, there is illustrated an embodiment of a lock assembly 90. The lock assembly 90 may be comprised of basic components such as a lock body 92, a locking pin 94, one or more lock springs 93, and a lock handle 98. In another embodiment of the present invention, a lock assembly 90 may be further comprised of components such as a retaining nut 97 and a set screw 99.

A lock body 92 provides a housing and protection for the moving parts of a lock assembly 90. FIG. 5 illustrates an embodiment wherein the lock body 92 is cylindrical in shape and hollow with openings at both ends. One end of the lock body's outer surface is threaded and an inner ring located within the hollow lock body narrows one opening. The end opposite the threaded end may be shaped or contoured to securely engage a lock handle 98.

A locking pin 94 may be telescopically engaged with the lock body 92. A locking pin 94 may be comprised of a metal, nonmetal, or combination thereof. A locking pin 94 may have a shape selected from the group consisting of rectangle, square, circle, semicircle, triangle, oblong, oval, tetrahedral, trapezoid, diamond, or combinations thereof. The embodiment illustrated in FIG. 5 shows a locking pin 94 with a ring 100 located on its outer surface. The locking pin 94 is also telescopically engaged with an opening 74 in each upright member 30 and an opening 74 in each second member 40 in order to hold a lower jaw 32 (attached to each upright member) and an upper jaw 42 (attached to each second member) in a closed position.

A lock spring 93, as used herein, is a compression coil spring that is telescopically engaged with the locking pin 94. FIG. 5 illustrates two lock springs 93, an outer lock spring 95 telescopically engaged with a locking pin 94, and an inner lock spring 96 telescopically engaged with a locking pin 94 and separated by a ring 100 located on the outer surface of the locking pin 94. Still referring to FIG. 5, one lock spring 96 engages both the ring located on the outer surface of the locking pin 94 and the lock handle 98, while the other lock spring 96 engages both the locking pin ring and inner ring of the lock body 92 when the lock assembly 90 is assembled.

Each lock spring 93 has a compression strength. Compression strength is the amount of force required to decrease the length of a compression spring. In one embodiment of the present invention, the compression strength of the outer lock spring 95 is greater than the compression strength of the inner lock spring 96. In another embodiment, the compression strength of the inner lock spring 96 is greater than the compression strength of the outer lock spring 95. In still another embodiment, the compression strength of the inner lock spring 96 is equal to the compression strength of the outer lock spring 95.

A lock handle 98 is a handle for the lock assembly 90 that is connected to the lock body 92. In one embodiment of the present invention, a set screw 99 is used to secure the lock body 92 within the lock handle 98. The set screw 99 engages the lock body 92 through a threaded hole in the lock handle 98. One embodiment of a lock handle 98 is illustrated in FIGS. 1 and 5. Another embodiment of a lock handle 98 is illustrated in FIGS. 6a, 6b, 6c, and 6d. In one embodiment of the present invention, a lock handle 98 may be used to compress or decompress one or more lock springs 93, one or more inner lock springs 95, one or more outer lock springs 96, or combinations thereof. Any known mechanism may be utilized to maintain the compression or decompression of a lock spring 93, inner lock spring 95, or outer lock spring 96. In one embodiment of the present invention, a lock handle 98 may be turned in one direction to engage a threaded device into a threaded receiver and turned in the opposite direction to disengage the threaded device from the threaded receiver. In another embodiment, a locking pin may have an arm emanating from its surface which may travel in a slot, and a lock handle 98 may be used to pull the locking pin 94, allowing the arm to travel down the slot, compressing a lock spring 93, followed by twisting the lock handle 98 in one direction to engage the arm to a partial ring. The lock handle 98 may then be twisted in the opposite direction, realigning the arm with the slot and allowing the arm to travel down the slot, and decompressing the lock spring 93.

A retaining nut 97 engages and screws into the outer surface threads of the lock body. The retaining nut 97 secures the lock assembly 90 to each upright member 30. The retaining nut 97 may be secured to each upright member 30 by any means including, but not limited to, screwing, riveting, welding, adhering, or combinations thereof.

In one embodiment of the present invention, a lock assembly may be comprised of a lock body 92, a locking pin 94 telescopically engaged with the lock body, one or more lock springs 93 telescopically engaged with the locking pin 94, and a lock handle 98 connected to the lock body 92. In still another embodiment, a lock assembly 90 may be comprised of a lock body, a locking pin 94 telescopically engaged with the lock body 92, where the locking pin has a ring around its outer surface, an outer lock spring 95 telescopically engaged with the locking pin and engaged to said locking pin ring, an inner lock spring 96 telescopically engaged with the locking pin and engaged to said locking pin ring, and a lock handle connected to the lock body 92.

An upright spring 60, as used herein, is a flexible elastic object used to store mechanical energy. An upright spring 60 may be operatively associated with a first upright member 30 and a second member 40. An upright spring 60 may be adapted to maintain a lower jaw 32 and an upper jaw 42 in an open position. An upright spring may be comprised of a metal, a nonmetal, or combinations thereof. In one embodiment of the present invention, the upright spring 60 is a coil spring. In another embodiment of the present invention, the upright spring 60 is a tension coil spring. In still another embodiment, the upright spring 60 is a compression coil spring.

Figure 4:
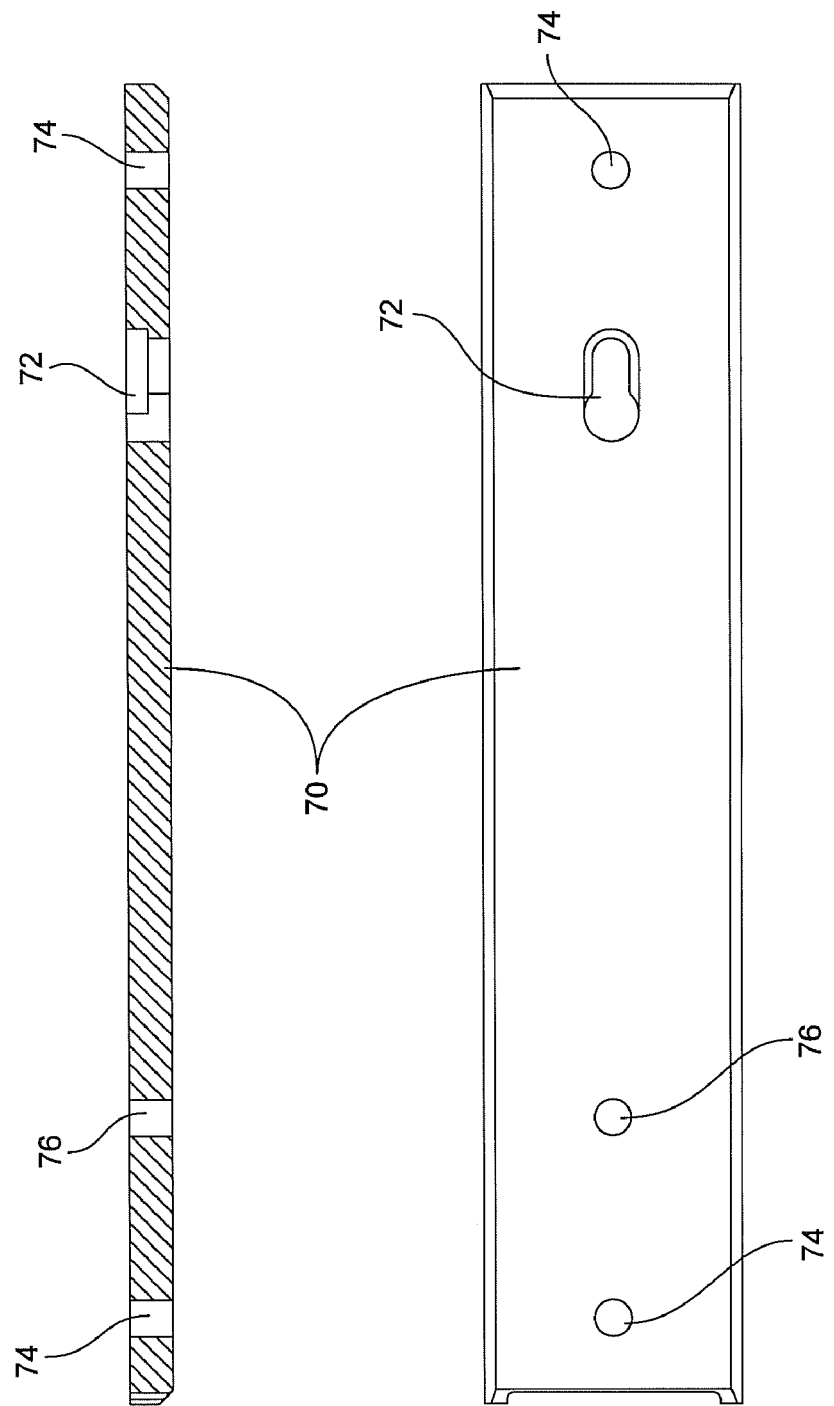
FIG. 4 illustrates a top and side view of a base plate of a motorcycle transport device.

A base plate 70 provides a stable platform to which the base 20 of a motorcycle transport device 10 may be secured. A base 20 may be demountably attached to a base plate 70. Referring to FIG. 4, there is illustrated an embodiment of a base plate 70. In one embodiment of the present invention, a base plate 70 may be secured to a surface, such as a trailer bed, a pickup truck bed, or the like, with a fastener 50. The fastener 50 may pass through an opening 74 in the base plate 70 to secure the base plate 70 to a surface. Also illustrated in FIG. 4 is a threaded opening 76 and a pin slot 72 which are described in greater detail below. In another embodiment, a base plate 70 may be permanently secured to a surface, such as a trailer bed, pickup truck bed, or the like.

A lockdown pin 25 is used to help secure the base 20 of a motorcycle transport device to a surface. A lock down pin 25 may be cylindrically shaped and may be comprised of a metal, nonmetal, or combination thereof. Looking to FIG. 2a, an embodiment of a lock down pin 25 is illustrated wherein one end of the lock down pin is flared out. A lock down pin protrudes away from the surface of the base 20 of a motorcycle transport device in a substantially perpendicular manner. In one embodiment of the present invention, a lock down pin 25 is removably engaged with a base 20 of a motorcycle transport device 10. In another embodiment, a lock down pin 25 is permanently secured to a base 20 of a motorcycle transport device 10. In yet another embodiment, two or more lock down pins 25 are removably engaged with a base 20 of a motorcycle transport device 10. In still another embodiment, two or more lock down pins are permanently secured to a base 20 of a motorcycle transport device 10. In another embodiment, one or more lock down pins 25 are used to help secure the base 20 of a motorcycle transport device 10 to a surface. In still another embodiment, one or more lock down pins 25 are used to help secure the base 20 of a motorcycle transport device 10 to a base plate 70. A lock down pin 25 may be slideably engaged with a pin slot 72 (FIG. 4).

A pin slot 72 is used in conjunction with a lock down pin 25 to help secure the base 20 of a motorcycle transport device to a surface. FIG. 4 illustrates one embodiment of a pin slot 72 located within a base plate 70. In this embodiment, the pin slot 72 is oval shaped and has a round opening on one end. The pin slot 72 has a lip emanating inward from part of its perimeter. In use, a lock down pin 25 is inserted into the round opening of the pin slot 72 and slideably engaged to the lip of the pin slot to secure the lock down pin 25 within the pin slot 72.

Operatively associated, as used herein, refers to two or more devices working with one another, Devices may be operatively associated mechanically, by wire, or wirelessly.

A fastener 50 is then passed through an opening 74 and/or a bushing 26 in the base 20 of the motorcycle transport device 10 to secure the motorcycle transport device 10 in a desired position. A fastener 50 works in conjunction with openings 74, bushings 26, threaded openings 76, or combinations thereof to aid in securing and stabilizing the motorcycle transport device 10. A fastener may include, but is not limited to, a nail, a screw, a bolt, a rivet, a spike, a stake, a dowel, a peg, or combinations thereof. In one embodiment, a fastener 50 may engage a threaded or non threaded opening to secure a base 20 to a base plate 70. In another embodiment, a fastener 50 may engage a threaded or non threaded opening to secure a base plate 70 to a surface. In still another embodiment, a fastener 50 may engage a threaded or non threaded opening to secure a base 20 to a surface.

A threaded opening 76 refers to an opening with sides that are threaded in order to accept a threaded fastener, such as a screw or bolt. In one embodiment of the present invention, an opening is made into a threaded opening through the insertion of a threaded insert. Threaded insert refers to a device which may be inserted into an opening in order to aid in securing two or more components together. The threaded insert may be threaded on its inside surface, its outside surface, or both. The threaded insert is designed to create greater clamping pressure between two or more components.

A retaining pin may also be used to maintain the lower jaw 32 and the upper jaw 42 in a closed position. The retaining pin is inserted into an opening on the first upright member 37 and an opening on the second member 47 when the lower jaw 32 and the upper jaw 42 are in a closed position to maintain that position. A retaining pin may be used alone, or in conjunction with the lock assembly 90 described above.

Figure 6C:
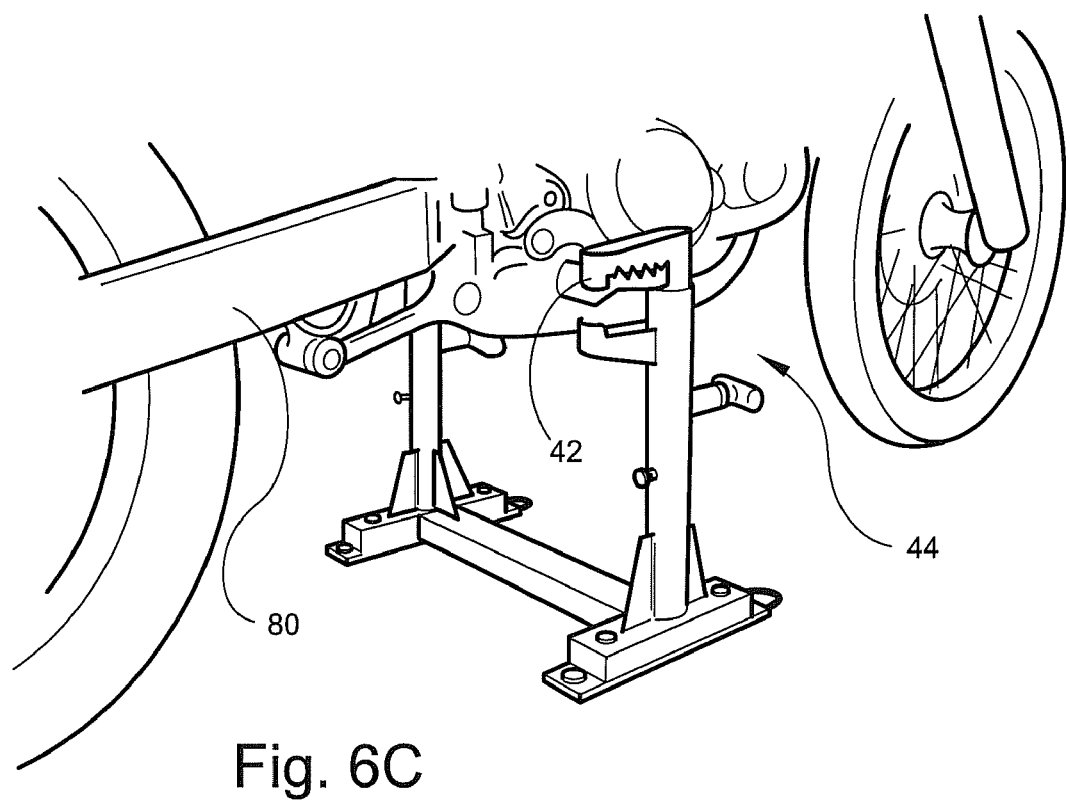
FIG. 6 illustrates a front perspective view (6a), a rear perspective view (6b), a rear perspective view in use (6c), and a side perspective view in use (6d) of a motorcycle transport device.
Figure 6D:
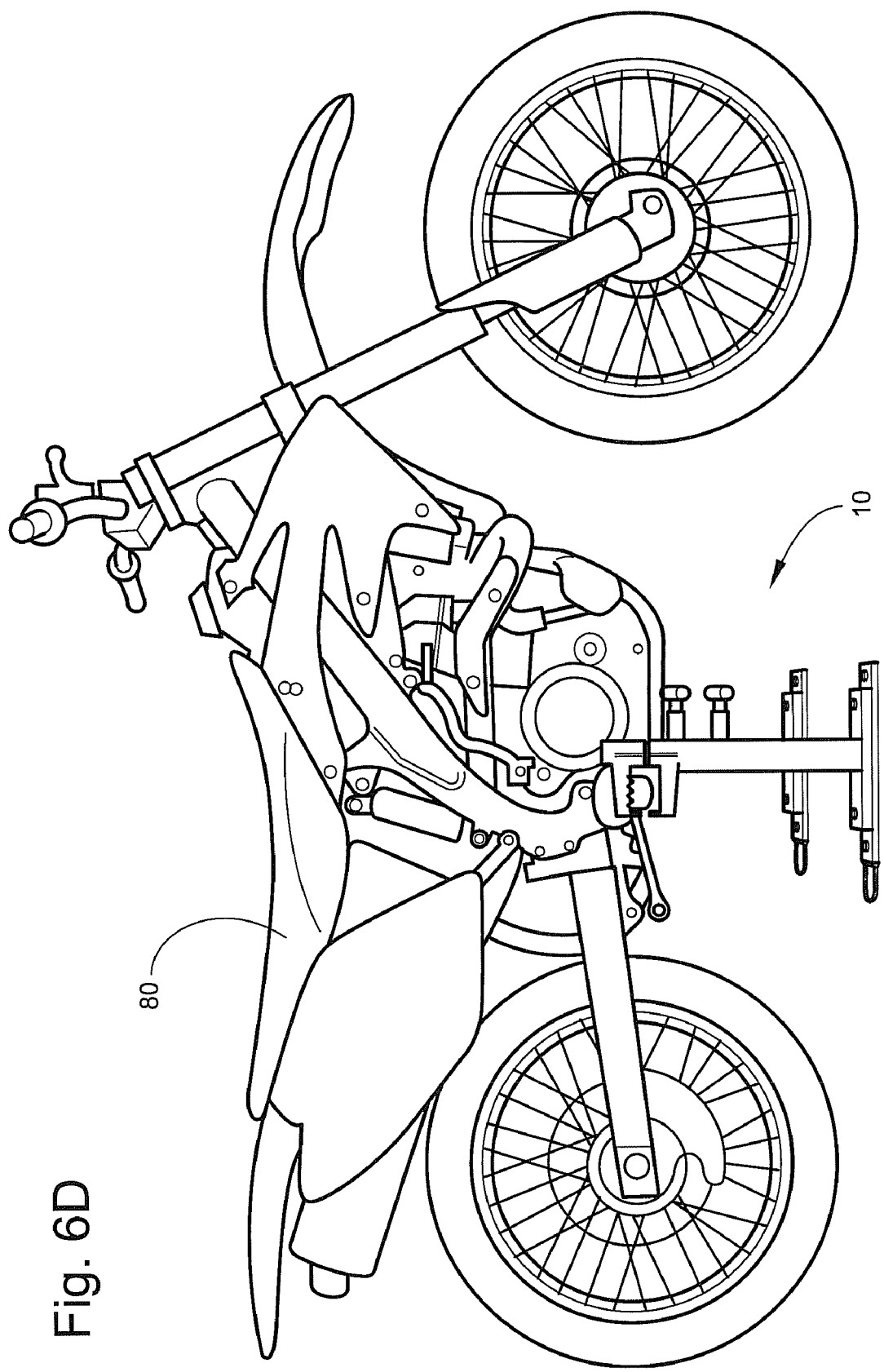

A motorcycle 80, as used herein, refers to any motorized vehicle having at least two wheels. Motorcycles 80 are required to have two or more footpegs 82 in order to use a motorcycle transport device 10. A motorcycle 80 usually comprises two footpegs 82 positioned on either side of the vehicle. A footpeg 82 provides a location for a motorcycle rider to place his or her feet while driving a motorcycle 80. FIG. 6c illustrates a front perspective view of an embodiment of a motorcycle 80 secured by the motorcycle transport device 10 using the motorcycle's foot pegs 82. FIG. 6d illustrates a side view of an embodiment of a motorcycle 80 secured by the motorcycle transport device 10 using the motorcycle's foot pegs 82. FIG. 6a illustrates the motorcycle transport device 10 in an open position 45. FIGS. 6b, 6c, and 6d illustrate the motorcycle transport device 10 in a locked position 44.

In one embodiment of the present invention, a motorcycle transport device 10 may comprise a base 20, a pair of first upright members 30 attached to the base 20 and a lower jaw 32 attached to each first upright member 30, a pair of second members 40 telescopically connected to the first upright members 30 and an upper jaw 42 attached to each second member 40, and a lock assembly 90 operatively associated with the first upright member 30 and the second member 40. The lock assembly 90 is adapted to hold the lower jaw 32 and the upper jaw 42 in a closed position.

The embodiment described above may further comprise an upright spring 60 operatively associated with each first upright member 30 and each second member 40. The upright spring 60 is adapted to maintain the lower jaw 32 and the upper jaw 42 in an open position.

The embodiment described above may further comprise a base plate 70 wherein a base 20 may be demountably attached to the base plate 70.

The embodiment described above may further comprise two or more lock down pins 25 emanating from the base 20, one or more pin slots 72 on each base plate 70, two or more openings 29 through the base 20, and one or more threaded openings 76 on each base plate 70. The lock down pins 25 may be slideably engaged to the pin slots 72, two or more fasteners 50 may pass through the openings 29 in the base and engage the threaded openings 76 in the base plate 70 to secure the base 20 to the base plate 70. In another embodiment, no lock down pins 25 are used. Looking to FIGS. 6a, 6b, 6c, and 6d, one or more fasteners 50 may be passed through openings 29 in the base and engaged to threaded openings 76 in the base plate 70 to secure the base 20 to the base plate 70.

In another embodiment of the present invention, a motorcycle transport device 10 may comprise a base 20, a pair of first upright members 30 attached to the base 20 and a lower jaw 32 attached to each first upright member 30, a pair of second members 40 telescopically connected to the first upright members 30 and an upper jaw 42 attached to each second member 40, an upright spring 60 operatively associated with each first upright member 30 and each second member 40, a lock assembly 90 operatively associated with the first upright member 30 and the second member 40, and a base plate 70 wherein a base 20 may be demountably attached to the base plate 70. The upright spring 60 is adapted to maintain the lower jaw 32 and the upper jaw 42 in an open position. The lock assembly 90 is adapted to hold the lower jaw 32 and the upper jaw 42 in a closed position.

The embodiment described above may further comprise two or more lock down pins 25 emanating from the base 20, one or more pin slots 72 on each base plate 70, two or more openings 29 through the base 20, and one or more threaded openings 76 on each base plate 70. The lock down pins 25 may be slideably engaged to the pin slots 72, two or more fasteners 50 may pass through the openings 29 in the base and engage the threaded openings 76 in the base plate 70 to secure the base 20 to the base plate 70.

This invention also describes a method of using a motorcycle transport device which is comprised of a series of steps. The first step is providing a motorcycle transport device comprised of a base plate 70, a base 20, a pair of first upright members 30 attached to the base 20 and a lower jaw 32 attached to each first upright member 30, a pair of second members 40 telescopically connected to the first upright members 30 and an upper jaw 42 attached to each second member 40, and a lock assembly 90 operatively associated with the first upright member 30 and the second member 40. The lock assembly 90 is adapted to hold the lower jaw 32 and the upper jaw 42 in a closed position. The next step is securing the base plate 70 to a surface followed by securing the base 20 to the base plate 70. The next step is providing a motorcycle 80 with a pair of foot pegs 82 followed by separating the lower jaws 32 from the upper jaws 42, positioning the motorcycle 80 between the first upright members 30, positioning each foot peg 82 between each the lower jaw 32 and the upper jaw 42 so that each foot peg 82 is above the lower jaw 32 and each upper jaw 42 is above each foot peg 82 and above each lower jaw 32. The next step is to depress each upper jaw 42 into each lower jaw 32 so that each foot peg 82 is held between each lower jaw 32 and each upper jaw 42. The final step is locking the lock assembly 90 so as to prevent substantial telescopic movement between the first upright member 30 and the second member 40.

The method described above may further comprise the steps of providing an upright spring 60 operatively associated with each first upright member 30 and each second member 40. The upright springs 60 are adapted to maintain the lower jaw 32 and the upper jaw 42 in an open position.

The method described above may further comprise the steps of providing two or more lock down pins 25 emanating from the base 20, followed by providing one or more pin slots 72 on each base plate 70. The next step is to slideably engage the lock down pins 25 to the pin slots 72. The next step is to provide two or more openings 29 through said base 20, provide two or more fasteners 50, and provide one or more threaded openings 76 on each said base plate 70. The next step is to pass the fasteners 50 through the openings 29 in said base and engage the fasteners 50 to said threaded openings 76 to secure the base 20 to the base plate 70. In another embodiment of the method described above, the lock assembly 90 may be spring loaded. In an alternative embodiment, the method described above may further comprise the steps of providing one or more openings 29 through said base, providing one or more fasteners 50, and providing one or more threaded openings 76 on each said base plate 70. This is followed by passing the fasteners 50 through the openings 29 in said base and engaging said fasteners 50 to said threaded openings 76 to secures said base 20 to said base plate 70.

The method described above may further comprise the steps of providing an upright spring 60 operatively associated with each first upright member 30 and each second member 40. The upright springs 60 are adapted to maintain the lower jaw 32 and the upper jaw 42 in an open position. The next step is to provide one or more openings 37 through each first upright member and provide one or more openings 47 through each second member. The next step is to provide a lock assembly 90 comprising a lock body 92, a locking pin 94 operatively associated with the lock body 92 and the locking pin 94 having a ring 100 around its outer surface, an outer lock spring 95 telescopically engaged with the locking pin 94 and engaged to the locking pin ring 100, an inner lock spring 96 is telescopically engaged with the locking pin 94 and engaged to the locking pin ring 100, and a lock handle 98 connected to the lock body 92. The next step is to insert each locking pin 94 into each opening 37 of each first upright member and aligning the locking pin 94 to telescopically engage the opening 47 of each second member 40, followed by compressing the outer lock spring 95 with the lock handle 98. The next step is providing a motorcycle 80 with a pair of foot pegs 82, separating the lower jaws 32 from the upper jaws 42, positioning the motorcycle 80 between the first upright members 30, positioning each foot peg 82 between each lower jaw 32 and each upper jaw 42 so that each foot peg 82 is above the lower jaw 32 and each upper jaw 42 is above each foot peg 82 and above each lower jaw 32. The next step is depressing each second member 40 within each upright member 30 resulting in the compression of each upright spring 60 by each second member 40 and each foot peg 82 being held between each lower jaw 32 and said upper jaw 42. The next step is aligning each opening 47 of each second member with each opening 37 of each upright member, engaging the locking pin 94 telescopically with the opening 37 of each upright member and the opening 47 of each second member. A portion of the compression of the outer lock spring 95 is released and the inner lock spring 96 is compressed with the locking pin ring 100.

The method described above may further comprise the steps of decompressing the outer lock spring 95 with said lock handle 98 resulting in the locking pin 94 being held in the opening 47 of each said second member due to the shearing force between each second member 40 and each upright member 30 exerted by the upright springs 60. The next step is depressing each second member 40, aligning each opening 47 of each second member with each opening 37 of each upright member, decompressing each inner lock spring 96, removing each locking pin 94 from each opening 47 of each second member, decompressing each upright spring 60, raising each second member 40, and removing each foot peg 82 from between each lower jaw 32 and each upper jaw 42.

In another embodiment of the method described above, the lower jaw 32 and the upper jaw 42 may further comprise one or more lower jaw teeth 36 emanating from the lower jaw 32 and one or more upper jaw teeth 46 emanating from the upper jaw 42. The lower jaw teeth 36 emanate in a direction substantially facing the upper jaw teeth 46.

The present invention may be embodied in other forms without departing from the spirit and the essential attributes thereof, and, accordingly, reference should be made to the appended claims, rather than to the forgoing specification, as indicated in the scope of the invention.

We claim:

1. A motorcycle transport device comprising:
a base;
a pair of first upright members;
said first upright members being attached to said base;
a lower jaw being attached to each said first upright member;
a pair of second members;
said second members being telescopically connected to said first upright members;
an upper jaw being attached to each said second member; and
a lock assembly operatively associated with each said first upright member and each said second member;
wherein said lock assembly being adapted to hold said lower jaw and said upper jaw in a closed position.

2. The motorcycle transport device of claim 1 further comprising:
an upright spring operatively associated with each said first upright member and each said second member.

3. The motorcycle transport device of claim 2 wherein said upright spring being adapted to maintain said lower respective lower jaw and said respective upper jaw in an open position.

4. The motorcycle transport device of claim 1 further comprising:
a base plate;
said base being demountably attached to said base plate.

5. The motorcycle transport device of claim 4 further comprising:
two or more lock down pins emanating from said base;
one or more pin slots on each said base plate;
wherein said lock down pins being slideably engaged to said one or more pin slots;
two or more openings through said base;
two or more fasteners passing through said openings in said base; and
one or more threaded openings on each said base plate;
wherein said fasteners engage said one or more threaded openings to secure said base to said base plate.

6. The motorcycle transport device of claim 1 wherein said lock assembly being spring loaded.

7. The motorcycle transport device of claim 1 wherein said lock assembly further comprising:
a lock body;
a locking pin telescopically engaged with said lock body;
one or more lock springs telescopically engaged with said locking pin; and
a lock handle connected to said lock body.

8. The motorcycle transport device of claim 1 wherein said lower jaw and said upper jaw further comprising:
one or more lower jaw teeth emanating from said lower jaw; and
one or more upper jaw teeth emanating from said upper jaw;
wherein said one or more lower jaw teeth emanate in a direction substantially facing said one or more upper jaw teeth.

9. A motorcycle transport device comprising:
a base;
a pair of first upright members;
said first upright members being attached to said base;
a lower jaw being attached to each said first upright member;
a pair of second members;
said second members being telescopically connected to said first upright members;
an upper jaw being attached to each said second member;
an upright spring being operatively associated with each said first upright member and each said second upright member;
wherein said upright spring being adapted to maintain said respective lower jaw and said respective upper jaw in an open position;
a lock assembly operatively associated with each said first upright member and each said second member;
wherein said lock assembly being adapted to hold said respective lower jaw and said respective upper jaw in a closed position; and
a base plate;
said base being demountably attached to said base plate.

10. The motorcycle transport device of claim 9 further comprising:
two or more lock down pins emanating from said base;
one or more pin slots on each said base plate;
wherein said lock down pins being slideably engaged to said one or more pin slots;
two or more openings through said base;
two or more fasteners passing through said openings in said base; and
one or more threaded openings on said base plate;
wherein said fasteners engage said one or more threaded openings to secure said base to said base plate.

11. The motorcycle transport device of claim 9 wherein said lock assembly being spring loaded.

12. The motorcycle transport device of claim 9 wherein said lock assembly further comprising:
a lock body;
a locking pin operatively associated with said lock body;

wherein said locking pin having a ring around its outer surface;
an outer lock spring telescopically engaged with said locking pin and engaged to said locking pin ring;
an inner lock spring telescopically engaged with said locking pin and engaged to said locking pin ring; and
a lock handle connected to said lock body.

13. The motorcycle transport device of claim 9 wherein said lower jaw and said upper jaw further comprising:
one or more lower jaw teeth emanating from said lower jaw; and
one or more upper jaw teeth emanating from said upper jaw;
wherein said one or more lower jaw teeth emanate in a direction substantially facing said one or more upper jaw teeth.

14. A method of using a motorcycle transport device comprising:
providing a motorcycle transport device comprising:
a base plate;
a base;
a pair of first upright members;
said first upright members being attached to said base;
a lower jaw being attached to each said first upright member;
a pair of second members;
said second members being telescopically connected to said first upright members;
an upper jaw being attached to each said second member;
a lock assembly operatively associated with each said first upright member and each said second member;
wherein said lock assembly being adapted to hold said lower jaw and said upper jaw in a closed position;
securing said base plate to a surface;
securing said base to said base plate;
providing a motorcycle;
said motorcycle having a pair of foot pegs;
separating said lower jaws from said upper jaws;
positioning said motorcycle between said first upright members;
positioning each said foot peg between each said lower jaw and each said upper jaw;
wherein each said foot peg being above said respective lower jaw;
wherein each said upper jaw being above each said foot peg and above each said lower jaw;
depressing each said lower jaw into each said upper jaw;
wherein each said foot peg being held between each said lower jaw and each said upper jaw; and
locking said lock assembly so as to prevent substantial telescopic movement.

15. The method of using a motorcycle transport device of claim 14 further comprising the steps of:
providing an upright spring operatively associated with each said first upright member and each said second member;
wherein said upright springs being adapted to maintain said respective lower jaw and said respective upper jaw in an open position.

16. The method of using a motorcycle transport device of claim 14 further comprising the steps of:
providing two or more lock down pins emanating from said base;
providing one or more pin slots on each said base plate;
slideably engaging said lock down pins to said one or more pins slots;
providing two or more openings through said base;
providing two or more fasteners;
providing one or more threaded openings on each said base plate;
passing said fasteners through said openings in said base; and
engaging said fasteners to said one or more threaded openings;
wherein said base being secured to said base plate.

17. The method of using a motorcycle transport device of claim 14 wherein said lock assembly being spring loaded.

18. The method of using a motorcycle transport device of claim 14 further comprising the steps of:
providing an upright spring operatively associated with each said first upright member and each said second member;
wherein said upright springs being adapted to maintain said respective lower jaw and said respective upper jaw in an open position;
providing one or more openings through each said first upright member;
providing one or more openings through each said second member;
providing each first upright member with a lock assembly comprising;
a lock body;
a locking pin operatively associated with said lock body;
wherein said locking pin having a ring around its outer surface;
an outer lock spring telescopically engaged with said locking pin and engaged to said locking pin ring;
an inner lock spring telescopically engaged with said locking pin and engaged to said locking pin ring; and
a lock handle connected to said lock body;
inserting each said locking pin into one of said one or more opening of each first upright member;
wherein said respective locking pin being aligned to telescopically engage one of said one or more openings of each second member;
compressing said outer lock spring with said respective lock handle;
depressing each second member within each upright member;
wherein each upright spring being compressed by each second member;
aligning one of said one or more openings of each second member with one of said one or more openings of each upright member;
engaging said respective locking pin telescopically with said opening of each upright member and said opening of each second member;
wherein a portion of the compression of said respective outer lock spring being released; and
compressing said respective inner lock spring with said locking pin ring.

19. The method of using a motorcycle transport device of claim 18 further comprising the steps of:
decompressing said outer lock spring with said respective lock handle;
wherein said respective locking pin being held in said opening of each said second member due to a shearing force between each said second member and each said upright member exerted by said upright springs;
depressing each said second member;
aligning each said opening of each second member with each said opening of each upright member;
decompressing each said inner lock spring;
removing each said locking pin from each said opening of each second member;
decompressing each said upright spring;

raising each said second member; and removing each said foot peg from between each said lower jaw and each said upper jaw.

20. The method of using a motorcycle transport device of claim 14 wherein each said lower jaw and each said upper jaw further comprising:

one or more lower jaw teeth emanating from said lower jaw; and one or more upper jaw teeth emanating from said upper jaw;

wherein said one or more lower jaw teeth emanate in a direction substantially facing said upper one or more jaw teeth.

* * * * *